US 8,843,133 B2

(12) United States Patent
Chen

(10) Patent No.: US 8,843,133 B2
(45) Date of Patent: Sep. 23, 2014

(54) METHOD OF HANDLING CELL CHANGE AND RELATED COMMUNICATION DEVICE

(75) Inventor: Te-Ming Chen, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 567 days.

(21) Appl. No.: 12/760,566

(22) Filed: Apr. 15, 2010

(65) Prior Publication Data

US 2010/0272064 A1    Oct. 28, 2010

Related U.S. Application Data

(60) Provisional application No. 61/172,191, filed on Apr. 23, 2009.

(51) Int. Cl.
*H04W 36/00* (2009.01)

(52) U.S. Cl.
CPC .................... *H04W 36/0083* (2013.01)
USPC ................. 455/436; 455/438; 455/444

(58) Field of Classification Search
CPC . H04W 36/16; H04W 36/0061; H04W 36/24; H04W 36/32; H04W 36/0094; H04B 7/18539
USPC ............. 455/436, 437, 438, 439, 444, 446, 455/452.2, 507, 512, 552.1
See application file for complete search history.

(56) References Cited

U.S. PATENT DOCUMENTS

| 2007/0248037 | A1  | 10/2007 | Stewart |          |
|--------------|-----|---------|---------|----------|
| 2010/0046428 | A1* | 2/2010  | Lee et al. | 370/328 |
| 2010/0222060 | A1* | 9/2010  | Zhang et al. | 455/436 |
| 2010/0260136 | A1* | 10/2010 | Fan et al. | 370/330 |
| 2012/0039180 | A1* | 2/2012  | Kim et al. | 370/241 |
| 2012/0115468 | A1* | 5/2012  | Lindoff et al. | 455/434 |

OTHER PUBLICATIONS

T-Mobile: "Per xARFCN priorities", 3GPP TSG RAN2#62, R2-082137, May 5-9, 2008, XP050139917, Kansas City, Missouri, USA.
T-Mobile: "Text Proposal to capture the agreemenbts from the UTRAN <-> E-UTRAN interworking discssuion on Monday", 3GPP TSG RAN2#60bis, R2-080606, Jan. 14-18, 2008, XP050263445, Seville, Spain.
T-Mobile: "Aspects for UTRAN <-> E-UTRAN interworking", 3GPP TSG RAN2#60bis, R2-080008, Jan. 14-18, 2008, XP050137913, Seville, Spain.
Nokia Siemens Networks, Nokia Corporation: "Prioritisation of inter-RAT cells for GERAN interworking", 3GPP TSG GERAN#36, GP-071684, Nov. 12-16, 2007, pp. 1-12, XP002587525, Vancouver, Canada.
3GPP TR 36.814 V0.4.1 3rd Generation Partnership Project; Technical Specification Group Radio Access Network; Further Advancements for E-UTRA Physical Layer Aspects (Release 9), Feb. 2009.

(Continued)

*Primary Examiner* — Andrew Wendell
(74) *Attorney, Agent, or Firm* — Winston Hsu; Scott Margo

(57) ABSTRACT

A method of handling cell change for a mobile device compatible with a plurality of radio access technologies (RATs) including a first RAT supporting reception and transmission on a plurality of component carriers and a second RAT supporting reception and transmission on a single component carrier, in a wireless communication system, the method includes determining that cells using the first RAT have higher priority for cell selection or cell reselection than cells using the second RAT.

17 Claims, 3 Drawing Sheets

(56) References Cited

OTHER PUBLICATIONS

3GPP TS 36.331 V8.5.0 3rd Generation Partnership Project; Technical Specification Group Radio Access Network; Evolved Universal Terrestrial Radio Access (E-UTRA) Radio Resource Control (RRC); Protocol specification (Release 8), Mar. 2009.

3GPP TS 36.304 V8.5.0 3rd Generation Partnership Project; Technical Specification Group Radio Access Network; Evolved Universal Terrestrial Radio Access (E-UTRA); User Equipment (UE) procedures in idle mode (Release 8), Mar. 2009.

3GGP RAN-GERAN Workshop on GERAN/E-UTRAN interworking, "Prioritisation of inter-RAT cells for GERAN-E-UTRAN interworking", Sophia Antipolis, France, Sep. 27-28, 2007, Nokia Siemens Networks, Nokia Corporation, Vodafone Group Plc, p. 1-5, GR-070018.

3GPP TSG-RAN WG2 Meeting #59, "E-UTRA Cell Selection and Cell Reselection Aspects", Athens Greece, Aug. 20-24, 2007, Nokia, Nokia Siemens Networks, Vodafone, R2-073622.

Office action mailed on May 13, 2013 for the Taiwan application No. 099112901, filing date Apr. 23, 2010, p. 1-8.

* cited by examiner

METHOD OF HANDLING CELL CHANGE AND RELATED COMMUNICATION DEVICE

CROSS REFERENCE TO RELATED APPLICATIONS

This application claims the benefit of U.S. Provisional Application No. 61/172,191, filed on Apr. 23, 2009 and entitled "Method for UE stays or moves in the cell supports its capabilities and related communication device" the contents of which are incorporated herein in their entirety.

BACKGROUND OF THE DISCLOSURE

1. Field of the Disclosure

The application relates to a method utilized in a wireless communication and a communication device thereof, and more particularly, to a method of handling cell change in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

When the UE is powered on, the UE shall select a suitable cell based on cell selection. When the UE has completed the cell selection and has chosen a cell, the UE monitors system information of the cell. According to the system information, such as cell status or cell reservations, the UE can know if the cell is barred or reserved. When camping on the cell, the UE accepts services provided by the cell and regularly searches for a better cell according to the cell reselection criteria. If a better cell is found, that cell is selected.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In addition, COMP is considered for LTE-Advanced as a tool to improve coverage of high data rates, cell edge throughput, and system efficiency, which implies dynamic coordination among multiple geographical separated points. That is, when an UE is in a cell-edge region, the UE is able to receive signal from multiple cells, and the multiple cells can receive transmission of the UE.

As can be seen from the above, the UE of the LTE system supports features of receiving and transmitting on one single component carriers, whereas the UE of the LTE-Advance system supports features of simultaneously receiving and transmitting on multiple component carriers. However, the UE can perform this capability only when the serving cell of the UE also supports simultaneously reception and transmission on multiple component carriers, causing a problem related to uncoordinated capabilities between the UE and a serving cell of the UE. The "uncoordinated capabilities" herein means that a UE supports a stronger capability of reception and transmission on multiple component carriers, but the serving cell does not support this capability. The UE cannot have its data transfer up to as high efficiency as possible in the situation of "uncoordinated capabilities".

SUMMARY OF THE DISCLOSURE

The application discloses a method of handling cell change in a wireless communication system and a related communication device in order to enhance data transfer efficiency.

A method of handling cell change for a mobile device compatible with a plurality of radio access technologies (RATs) including a first RAT supporting reception and transmission on a plurality of component carriers and a second RAT supporting reception and transmission on a single component carrier, in a wireless communication system is disclosed. The method includes determining that cells using the first RAT have higher priority for cell selection or cell reselection than cells using the second RAT.

A method of handling cell change for a network in a wireless communication system is disclosed. The method includes obtaining a radio access technology (RAT) type of a serving cell of a mobile device compatible with a plurality of RATs, where the plurality of RATs include a first RAT supporting reception and transmission on a plurality of component carriers and a second RAT supporting reception and transmission on a single component carrier, and directing the mobile device from the serving cell to a first cell using the first RAT when the RAT type of the serving cell is not the first RAT.

A communication device of a wireless communication system for handling cell change is disclosed. The communication device compatible with a plurality of radio access technologies (RATs) including a first RAT supporting reception and transmission on a plurality of component carriers and a second RAT supporting reception and transmission on a single component carrier includes means for performing cell selection or cell reselection, and means for managing cell priority of the cell selection or the cell reselection, wherein the means for managing the cell priority of the cell selection or the cell reselection determines that cells using the first RAT has higher priority for cell selection or cell reselection than cells using the second RAT.

A network of a wireless communication system for handling cell change of a mobile device in the wireless communication system is disclosed. The network includes means for obtaining a radio access technology (RAT) type of a serving cell of a mobile device compatible with a plurality of RATs, where the plurality of RATs include a first RAT supporting reception and transmission on a plurality of component carriers and a second RAT supporting reception and transmission on a single component carrier, and means for directing the mobile device from the serving cell to a first cell using the first RAT when the RAT type of the serving cell is not the first RAT.

These and other objectives of the present disclosure will no doubt become obvious to those of ordinary skill in the art after reading the following detailed description of the preferred example that is illustrated in the various figures and drawings.

DETAILED DESCRIPTION

Figure 1:
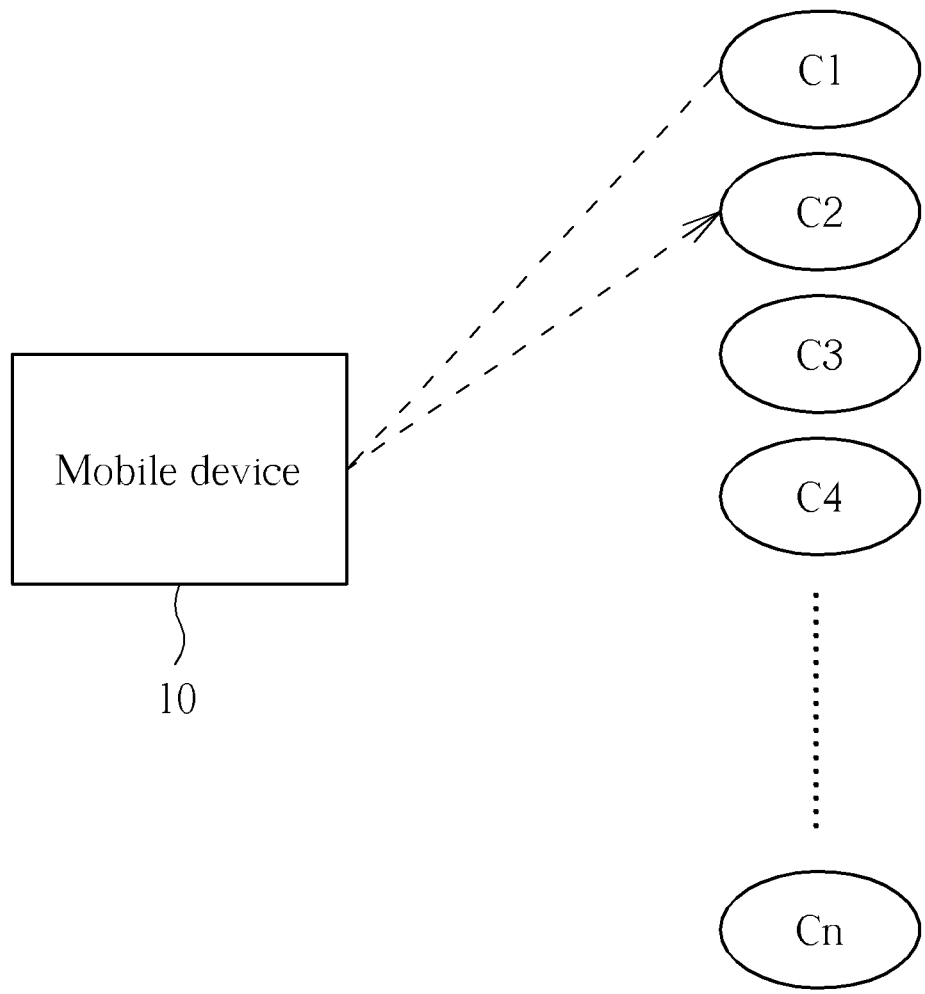
FIG. 1 is a schematic diagram of an exemplary wireless communication system.

Please refer to FIG. 1, which illustrates a schematic diagram of connections between a mobile device 10 and cells C1-Cn. The mobile device 10 supports a plurality of radio access technologies (RATs) that include RATs supporting receiving and transmitting only on one component carrier, such as Universal Mobile Telecommunications System (UMTS) and long-term evolution (LTE) RATs, and RATs supporting receiving and transmitting on multiple component carriers, such as an LTE-Advanced RAT including features of carrier aggregation, coordinated multipoint transmission/reception (COMP), multimedia broadcast multicast service (MBMS), etc. Each of the cells C1-Cn supports one of the abovementioned RATs. In an example, any of the cells C1-Cn that support the function of receiving and transmitting on multiple component carriers is referred as a LTE-Advanced cell. On the other hand, any of the cells C1-Cn that support the function of receiving and transmitting only on a single component carrier is referred as a non-LTE-Advanced cell. In addition, the mobile device 10 is referred as a user equipment (UE) or a mobile station (MS), and can be a device such as a mobile phone, a computer system, etc.

Figure 2:
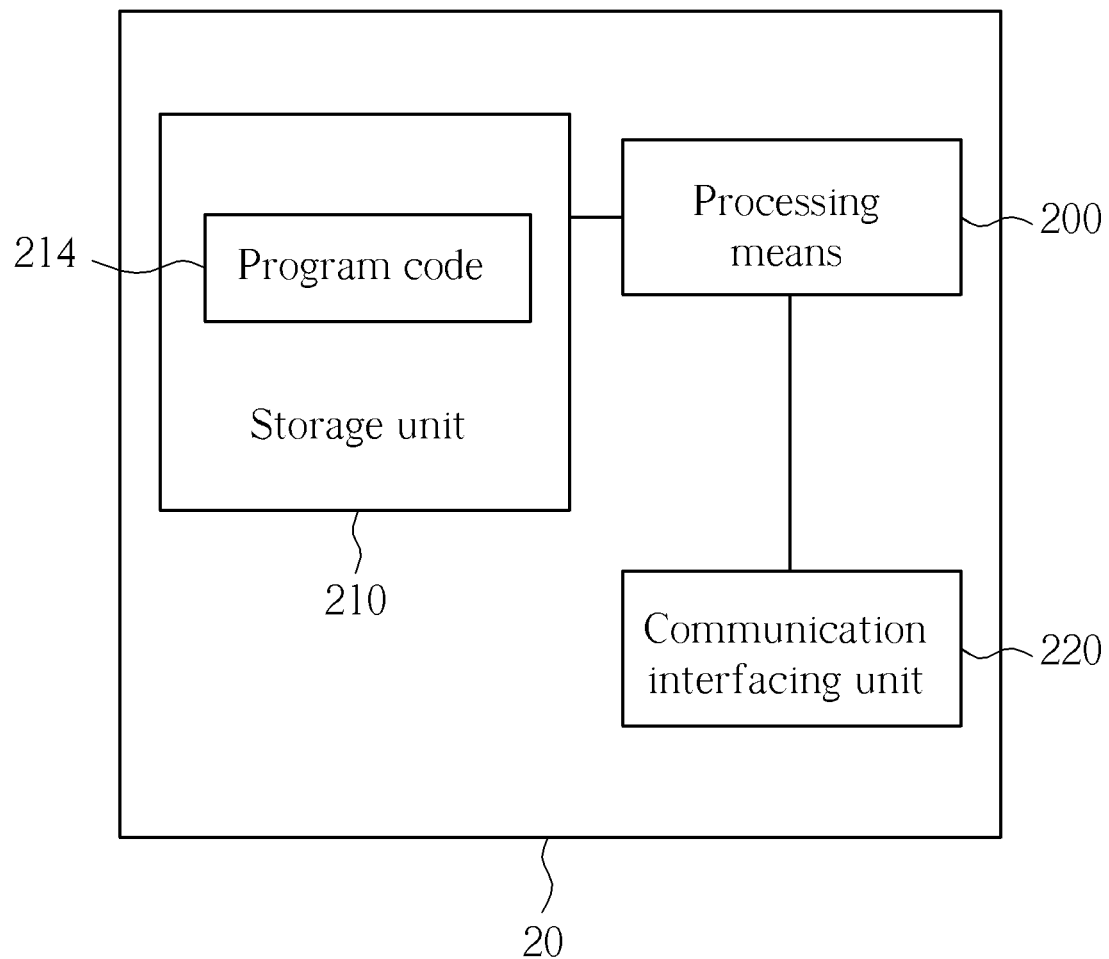
FIG. 2 is a schematic diagram of an exemplary communication device according to the present disclosure.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or ASIC, a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver and can exchange wireless signals with the network according to processing results of the processing means 200.

The program code 214 includes program code of a RRC layer which can control cell selection or reselection functionality. The RRC layer is used for performing broadcast, paging, RRC connection management, measurement reporting and control, and radio bearer (RB) control responsible for generating or releasing radio bearers (RBs). In addition, the RRC layer includes a RRC_CONNECTED state capable of unicast data transfer, and a RRC_IDLE state incapable of the unicast data transfer. The RRC layer is allowed to establish multiple component carriers or only one component carrier for data transfer depended on the RAT used by the communication device 20.

When the communication device 20 in the RRC_IDLE state performs cell change including cell selection or cell reselection, the communication device 20 selects/reselects a LTE-Advanced cell instead of a non-LTE-A cell. On the other hand, when the communication device 20 is in the RRC_CONNECTED state, the communication device 20 is led to a LTE-Advanced cell by the network. Therefore, the communication device 20 can surely perform reception and transmission on multiple component carriers.

Figure 3:
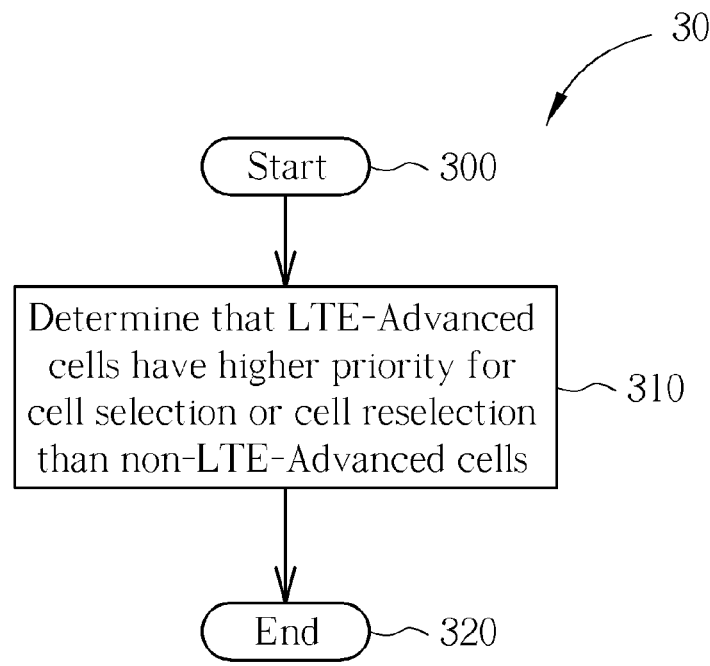
FIG. 3-4 are flowcharts of exemplary processes according to the present disclosure.

Please refer to FIG. 3, which illustrates a flowchart of an exemplary process 30. The process 30 is utilized for handling cell change of a UE supporting multiple RATs as the mobile device 10 of FIG. 1 in a wireless communication system. The process 30 can be compiled into the program code 214 and includes the following steps:

Step 300: Start.

Step 310: Determine that LTE-A cells have higher priority for cell selection or cell reselection than non-LTE-A cells.

Step 320: End.

According to the process 30, the UE sets priority of the LTE-Advanced cells higher than priority of the non-LTE-Advanced cells in priority information stored in the UE in the RRC_IDLE state. Therefore, when the UE performs cell selection or cell reselection, the UE firstly selects/reselects a LTE-Advanced cell according to the priority information of the UE, so as to perform corresponding RAT capability (e.g. carrier aggregation).

During the cell selection or cell reselection, the UE may perform a cell search procedure. If a LTE-Advanced cell is found, the UE then selects the LTE-Advanced cell and camps on the selected LTE-Advanced cell. On the other hand, if no LTE-Advanced cell is found, the UE selects a non-LTE-Advanced cell to camp on. Take an example associated with the FIG. 1. Assume that the cells C2-C4 are LTE-Advanced cells, whereas the cells C1, C5-Cm are non-LTE-Advanced cells. Based on the process 30, the UE determines that the priority of the cells C2-C4 is higher than the priority of the cells C1, C5-Cm for the cell selection/reselection. When the UE performs the cell search procedure and finds the cells C2-C5, the UE selects one of the cells C2-C4 to camp on. Therefore, the UE can execute the function of receiving and transmitting data on multiple component carriers, thereby enhancing data transmission efficiency. However, if the UE does not find any of the cells C2-C4, the UE selects the cell C5 to camp on, and thereby receives and transmits data only on a single component carrier.

In addition, each of the LTE-Advanced cells may broadcast a version of the RAT. For example, each of the cells C2-C4 broadcasts a RAT type notifying all the UEs attempting to camp on that LTE-Advanced RAT is supported in this cell. In addition, each of the LTE-Advanced cells may broadcast a release version (e.g. LTE-Advanced RAT of release 10) provided by 3rd Generation Partnership Project (3GPP). The version of the RAT can be broadcasted in system information of the LTE-Advance cells. Therefore, the UE can know which cells are LTE-Advanced cells and thereby determine that these cells have higher priority than other cells. Please note that, non-LTE-Advanced cells are unable to broadcast any indicator to inform the UE, so the UE can know that the cells broadcasting no RAT version information are non-LTE-Advanced cells.

Based on the process 30, the UE supporting LTE-Advanced RAT always selects/reselects a LTE-Advanced cell, thereby preventing uncoordinated cell selection/reselection occurs. Therefore, communication quality can be maintained.

Figure 4:
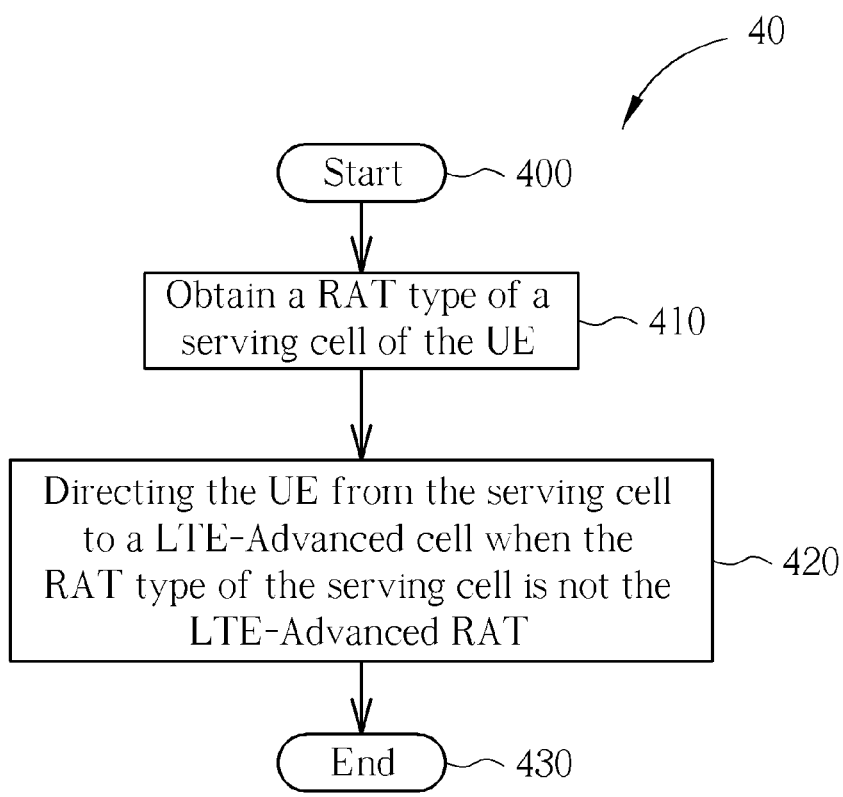

Please refer to FIG. 4, which illustrates a flowchart of an exemplary process 40. The process 40 is utilized in the network for handling cell change of a UE supporting multiple RATs as the mobile device 10 of FIG. 1 in a wireless communication system. The process 40 can be compiled into the program code 214 and includes the following steps:

Step 400: Start.
Step 410: Obtain a RAT type of a serving cell of the UE.
Step 420: Directing the UE from the serving cell to a LTE-Advanced cell when the RAT type of the serving cell is not the LTE-Advanced RAT.
Step 430: End.

According to the process 40, the network firstly determines whether the RAT type of the serving cell of the UE is the LTE-Advanced RAT, and thereby decides to direct the UE from the serving cell to a LTE-Advanced cell when the RAT type of the serving cell is not the LTE-Advanced RAT.

Take an example associated with the FIG. 1. Assume the cell C1 is a serving cell of the mobile device 10. If the network obtains that the RAT type of the cell C1 is the LTE-Advanced RAT, the network does not direct the UE to any of the cells C2-Cm. On the other hand, if the network obtains that the RAT type of the cell C1 is not the LTE-Advanced RAT, the network directs the UE to one of the cells C2-Cm, which is a LTE-Advanced cell.

In addition, the network may receive from the UE a message that indicates capability of the UE and can be used for request the network to direct the UE from the serving cell to a LTE-Advanced cell. Via the message, the network can know that the UE supports the LTE-Advanced RAT, and thereby directs the UE to a LTE-Advanced cell when the serving cell of the UE does not use the LTE-Advanced RAT. The message may be a RRCConnectionRequest message, a ATTACH REQUEST message, a UECapabilityInformation message or a SERVICE REQUEST message.

After the network receives the message from the UE, the network may not straightly direct the UE to a LTE-Advanced cell. Instead, the network may spontaneously send a measurement request message to request the UE to perform measurement to at least a LTE-Advanced cell. After the UE performs measurement and sends a measurement report including measurement results related to the measured LTE-Advanced cells, the network directs the UE to one of the measured LTE-Advanced cells according to the measurement report when the serving cell of the UE is a non-LTE-Advanced RAT. That is, the network may request the measurement report from the UE, and thereby determine which one of LTE-Advanced cells the UE should be directed to based on the measurement report.

Alternatively, the network may not take the measurement report into consideration, and sends a RRC message to direct the UE to any of the LTE-Advanced cells. That is, the network may blindly direct the UE to a LTE-Advanced cell. The RRC message may be a RRCConnectionReject message, a RRCConnectionRelease message, a handover command message or a cell change order message.

Based on the process 40, the UE supporting the LTE-Advanced RAT is always directed to a LTE-Advanced cell by the network, so as to perform reception and transmission on multiple component carriers. Therefore, communication quality can be maintained.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to ensure that the UE supporting data transfer of multiple connections (e.g. multiple component carriers or COMP) can be served by a coordinate cell. Thus, the UE can perform reception and transmission on multiple component carriers, so as to enhance data transfer efficiency.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling cell change for a mobile device supporting reception and transmission on a plurality of component carriers simultaneously and on a single component carrier in a wireless communication system, the method comprising:
    determining priority of a cell for cell selection or cell reselection according to whether the cell supports a function of reception and transmission on a plurality of component carriers simultaneously;
    wherein a first cell supporting the function of reception and transmission on the component carriers simultaneously is determined to have a higher priority for cell selection or reselection than a second cell not supporting the function of reception and transmission on the component carriers simultaneously.

2. The method of claim 1 further comprising:
    performing a cell search when the cell selection or cell reselection is initiated; and
    selecting the second cell when no first cell is found during the cell search.

3. The method of claim 1, wherein the first cell is a long-term evolution advanced (LTE-Advanced) cell.

4. The method of claim 3, wherein the determining step comprises:
    setting priority of the LTE-Advanced cell higher than priority of a non-LTE-Advanced cell in priority information corresponding to a radio resource control (RRC) idle state of the mobile device.

5. A method of handling cell change for a network in a wireless communication system, the method comprising:
    obtaining a radio access technology (RAT) type of a serving cell of a mobile device, where the RAT type indicates whether the serving cell supports a function of reception and transmission on a plurality of component carriers simultaneously; and
    directing the mobile device from the serving cell to a first cell supporting the function of reception and transmission on the component carriers simultaneously, when the RAT type indicates the serving cell does not support the function of reception and transmission on the component carriers simultaneously.

6. The method of claim 5 further comprising:
    receiving a message from the mobile device; and
    determining that the mobile device supports reception and transmission on the component carriers simultaneously, according to the message;
    wherein the directing step comprises according to the message, directing the mobile device from the serving cell to the first cell when the RAT type indicates the serving cell does not support the function of reception and transmission on the component carriers simultaneously.

7. The method of claim 5 further comprising:
    sending a measurement request message to request the mobile device to perform measurement to at least a cell supporting the function of reception and transmission on the component carriers simultaneously; and receiving from the mobile device a measurement report message including measurement results of the cells supporting the function of reception and transmission on the component carriers simultaneously.

8. The method of claim 7, wherein the directing step comprises according to the measurement report message, directing the mobile device from the serving cell to the first cell when the RAT type indicates the serving cell does not support the function of reception and transmission on the component carriers simultaneously.

9. The method of claim 5, wherein the first cell is a long-term evolution advanced (LTE-Advanced) cell.

10. A communication device of a wireless communication system for handling cell change, the communication device supporting reception and transmission on a plurality of component carriers simultaneously and on a single component carrier, the communication device comprising:
  means for performing cell selection or cell reselection; and
  means for managing cell priority of the cell selection or the cell reselection, wherein the means for managing the cell priority of the cell selection or the cell reselection determines priority of a cell for cell selection or cell reselection according to whether the cell supports a function of reception and transmission on a plurality of component carriers simultaneously;
  wherein a first cell supporting the function of reception and transmission on the component carriers simultaneously is determined to have a higher priority for cell selection or reselection than a second cell not supporting the function of reception and transmission on the component carriers simultaneously.

11. The communication device of claim 10 further comprising:
  means for performing a cell search when the cell selection or cell reselection is initiated; and
  means for selecting the second cell when no first cell is found during the cell search.

12. The communication device of claim 10, wherein the first cell is a long-term evolution advanced (LTE-Advanced) cell.

13. The communication device of claim 12, wherein the means for managing cell priority of the cell selection or the cell reselection comprises:
  means for setting priority of the LTE-Advanced cell higher than priority of a non- LTE-Advanced cell in priority information corresponding to a radio resource control (RRC) idle state of the mobile device.

14. A network of a wireless communication system for handling cell change, the network comprising:
  means for obtaining a radio access technology (RAT) type of a serving cell of a mobile device, where the RAT type indicates whether the serving cell supports a function of reception and transmission on a plurality of component carriers simultaneously; and
  means for directing the mobile device from the serving cell to a first cell supporting the function of reception and transmission on the component carriers simultaneously, when the RAT type indicates the serving cell does not support the function of reception and transmission on the component carriers simultaneously.

15. The network of claim 14 further comprising:
  means for receiving a message from the mobile device; and
  means for determining that the mobile device supports reception and transmission on the component carriers simultaneously, according to the message;
  wherein the means for directing the mobile device from the serving cell to the first cell comprises means for according to the message, directing the mobile device from the serving cell to the first cell when the RAT type indicates the serving cell does not support the function of reception and transmission on the component carriers simultaneously.

16. The network of claim 14 further comprising:
  means for sending a measurement request message to request the mobile device to perform measurement to at least a cell supporting the function of reception and transmission on the component carriers simultaneously; and
  means for receiving from the mobile device a measurement report message including measurement results of the cells supporting the function of reception and transmission on the component carriers simultaneously.

17. The network of claim 16, wherein the means for directing the mobile device from the serving cell to the first cell comprises means for according to the measurement report message, directing the mobile device from the serving cell to the first cell when the RAT type indicates the serving cell does not support the function of reception and transmission on the component carriers simultaneously.

* * * * *